United States Patent [19]

Pecoraro

[11] 4,076,738
[45] Feb. 28, 1978

[54] POLYISOBUTYLENE OXIDATION PROCESS

[75] Inventor: Joseph Michael Pecoraro, Burlington, N.J.

[73] Assignee: E. I. Du Pont de Nemours and Company, Wilmington, Del.

[21] Appl. No.: 701,748

[22] Filed: Jun. 30, 1976

[51] Int. Cl.² .............................................. C09F 7/02
[52] U.S. Cl. .................................. 260/406; 260/407; 260/413; 260/537 R
[58] Field of Search ................. 260/406, 413, 537 R, 260/407

[56] References Cited

U.S. PATENT DOCUMENTS

| 3,346,631 | 10/1967 | Boyer et al. | 260/523 |
|---|---|---|---|
| 3,362,971 | 1/1968 | Mitchell | 260/413 |
| 3,427,351 | 2/1969 | Nahagawa et al. | 260/537 |
| 3,576,742 | 4/1971 | Herman et al. | 252/51.5 |
| 3,647,691 | 3/1972 | Vineyard | 252/51.5 A |
| 3,715,313 | 2/1973 | Haseltine et al. | 252/52 |
| 3,778,487 | 12/1973 | Driscoll et al. | 260/676 R |
| 3,793,203 | 2/1974 | Driscoll et al. | 252/56 R |
| 3,931,024 | 1/1976 | Hu | 252/51.5 R |

FOREIGN PATENT DOCUMENTS

| 1,027,410 | 4/1966 | United Kingdom | 260/413 |

Primary Examiner—Winston A. Douglas
Assistant Examiner—John F. Niebling
Attorney, Agent, or Firm—James A. Costello

[57] ABSTRACT

A process for making polyisobutylcarboxylic acid compositions by ozonizing polyisobutylene and then contacting the ozonized polyisobutylene with nitric acid.

2 Claims, No Drawings

POLYISOBUTYLENE OXIDATION PROCESS

BACKGROUND OF THE INVENTION

This invention concerns a two-step oxidation process for making polyisobutylcarboxylic acids by ozonizing polyisobutylene and then contacting the ozonized polyisobutylene with nitric acid.

High molecular weight carboxylic acids, and derivatives thereof, having long hydrocarbon chains terminated at one end by a carboxyl group are useful in hydrocarbon fuels and oils for a variety of purposes. Polyisobutylenes which are derived from isobutylene and which contain a potentially oxidizable olefinic link at or near the terminal carbon atom are potential sources of such long chain carboxylic acids. Procedures described in the art for oxidizing polyisobutylenes are usually unsatisfactory for producing polyisobutylcarboxylic acids in practical amounts uncontaminated by troublesomely large proportions of neutral polyisobutylene derivatives.

For instance, the ozonization of polyisobutylenes disclosed in U.S. Pat. Nos. 2,461,966 and 3,715,313 produces neutral oxygenated products, (aldehydes and ketones) and very little carboxylic acid. U.S. Pat. No. 3,715,313 discloses oxidation of ozonized polyisobutylenes with hydrogen peroxide to form a carboxylic acid component which can be removed from the reaction mixture by extraction with aqueous sodium carbonate solution and then with water. Such carboxylic acid component evidently constitutes a minor proportion of the oxidized mass, the major (unextracted) portion being disclosed as a neutral carbonyl-containing component, e.g. a ketone.

U.S. Pat. No. 3,931,024 teaches making high molecular weight oxygenated polyolefin reactants by heating the polymer in the presence of air. British patent specification No. 1,172,818 teaches the making of ketones by ozonizing a polyolefin and treating the ozonized polyolefin with hydrogen. British patent specification No. 1,027,410 discloses the oxidation of polyisobutylenes with nitric acid. Such a procedure, however, produces an acidic mixture containing only a small proportion of carboxylic acids, the large proportion being made up of aliphatic nitro compounds.

Nonoxidative procedures for converting polyisobutylenes to long chain carboxylic acids are known. For instance, condensation of polyisobutylenes with maleic anhydride provides polyisobutenylsuccinic anhydrides. U.S. Pat No. 3,219,666 discloses preparation of polyisobutenylcarboxylic acids by chlorinating a polyisobutylene, converting the chlorinated product to the corresponding nitrile, and hydrolyzing the nitrile to the carboxylic acid. U.S. Pat. No. 3,897,224 discloses condensation of acids or esters with long chain olefin polymers in the presence of halogen. Generally, all such nonoxidative procedures produce acids which are characterized by poor oxidative stabilities and poor hydrolytic stabilities of their derivatives.

Needed, then, is a practical and efficient process for substantially completely converting polyisobutylenes to polyisobutylcarboxylic acids which acids are characterized by good oxidative stabilities and good stabilities of their derivatives.

SUMMARY OF THE INVENTION

The process of this invention is to oxidize polyisobutylene to form a polyisobutylcarboxylic acid composition having no more than about 20% by weight of a nonacidic polyisobutylene component, said process comprising i. contacting polyisobutylene having an average molecular weight of about 300 to 3000, with ozone, in a liquid phase, and ii. contacting the ozonized polyisobutylene made in (i) with nitric acid, in a liquid phase.

The ozonation step can be carried out in an ozone-inert solvent for the polyisobutylene. It is preferred that the ozone be introduced into the polyisobutylene environment in a stream comprising about 1% to 10, by weight, of ozone in a carrier gas. The ozone concentration in the carrier gas is not critical and any practical concentration can be used. The carrier gas can be, say, nitrogen, air, or oxygen, and is preferably air or oxygen. Operable ozonation temperatures are about $-80°$ to $60°$ C. Preferred temperatures are $-10°$ to $30°$ C. The temperature of $-80°$ C is the lower practical limit and $60°$ C is the upper practical limit. Above about $60°$ C the ozonation reaction may tend to cause some polymer destruction.

In the process of this invention there is an interrelationship of time, temperature and ozone concentration. Using the description provided herein, one skilled in the art will be able to vary any two of the three variables to correlate with a desired set response for the third variable without excessive experimentation.

The nitric acid oxidation step can be carried out in the presence of a nitric acid-inert solvent for the ozonized polyisobutylene. Aqueous nitric acid of specific gravity of about 1.18 (30%) to 1.48 (89%) can be employed, the preferred specific gravity being about 1.32 (50%) to 1.42 (70%). The reaction temperatures are about 20° to 110° C, preferably 40° to 100° C.

DETAILS OF THE INVENTION

The Ozonation Reaction

Use of a solvent is not required but is convenient since the polyisobutylenes of the recited molecular weights tend to be viscous. Useful solvents include hexane, heptane, octane, petroleum ethers, benzene, toluene, xylene, methylene chloride, chloroform, carbon tetrachloride, dichloroethane, tetrachloroethane and the like. The preferred solvents are nonhydroxylic solvents such as carbon tetrachloride since they provide for higher yields of the polyisobutylcarboxylic acids in the overall process.

Ozone is conveniently supplied at a rate such that the exit gas from the reaction mixture is just devoid of ozone. The ozone supply is continued until ozone is detected in the exit gas. Sodium or potassium iodide solution can be used to detect the breakthrough of unreacted ozone. Normally, one mole of ozone is utilized per mole of polyisobutylene and the uptake of the first mole of ozone per mole of polyisobutylene is fairly rapid. However, it has been found advantageous to continue the ozone addition until a total of about 2 to 4 moles of ozone per mole of polyisobutylene has been added, higher overall yields of polyisobutylcarboxylic acid being thereby obtained. Larger excesses of ozone can be employed but may tend to degrade the product molecular weight.

The term "ozonized polyisobutylene" refers to polyisobutylene treated with ozone in the manner described. Inspection of the ozonized polyisobutylene by infrared and nuclear magnetic resonance techniques indicates the product consists predominantly of polyisobutyl ketones.

The Nitric Acid Reaction

Generally, for each part by weight of ozonized polyisobutylene, about 0.2 to 1 part of concentrated (70%) nitric acid (or its equivalent) is used for the oxidation. Suitable solvents are those inert to nitric acid under the oxidation conditions and include methylene chloride, chloroform and carbon tetrachloride. The preferred solvent is carbon tetrachloride.

The oxidation temperature will depend upon several factors such as the concentration of the ozonized polyisobutylene (when a solvent is used) and the amount and the concentration of the nitric acid. Temperatures above about 110° C should be avoided to minimize depolymerization of the polyisobutyl chain. The time of reaction is also dependent upon the factors mentioned above but generally about 2 hours to 24 hours are used. If desired, other ingredients used in nitric acid oxidation processes such as sulfuric acid, phosphoric acid, vanadium compounds, manganese compounds and surfactants, can be present.

The nitric acid oxidation reaction mixture mass is worked up by conventional means such as by washing with water or with water-alcohol mixtures to remove nitric acid and low molecular weight by-products, and by distillation to remove volatile solvent.

The Acid Products

The polyisobutylcarboxylic acid compositions are normally liquid and are readily handled as such or as solutions in organic hydrocarbon solvents. The polyisobutylcarboxylic acid compositions prepared by the invention process have an acid content of at least about 80% by weight of the composition and an average molecular weight of about 300 to 3000. The predominant portion of the polyisobutylcarboxylic acid is a monocarboxylic acid wherein substantially all of the carboxyl groups are attached to tertiary carbon atoms (i.e. carbon atoms having no hydrogen attached thereto) of the polyisobutyl group. Depending upon the severity of the ozonization and the nitric acid oxidation steps, the polyisobutylcarboxylic acid component can contain up to about 20%, by weight of the acid components, of a polyisobutyldicarboxylic acid component (the carboxyl group also being attached to tertiary carbon atoms).

The presence of carboxylic acid groups attached to tertiary carbon atoms is detected by infrared spectroscopy, 220 MHz Nuclear Magnetic Resonance (NMR) spectroscopy. That substantially all carboxyl groups of the polyisobutylcarboxylic acids are attached to tertiary carbon atoms is notable since derivatives of such acids show exceptionally good resistance to hydrolytic degradation.

Infrared spectroscopy shows the presence of a carboxylic acid group by a strong absorption band at 1710 cm$^{-1}$. Should a weak absorption band appear at 1550 cm$^{-1}$ said band indicates the presence of an aliphatic nitro group. The 220 MHz NMR spectroscopy shows the presence of a carboxylic acid group by a strong peak at 11 ppm. The $^{13}$C NMR spectroscopy shows a tertiary carboxylic acid group by a major downfield peak at 185 ppm. Two small peaks at 177.8 ppm and 178.2 ppm indicate the presence of a dibasic tertiary carboxylic acid.

The polyisobutyl carboxylic acid compositions have substantially the same molecular weight as the starting polyisobutylene as indicated by Gel Permeation Chromatography. The acid products have an acid number of about 15 to 186. The acid number, defined as milligrams of potassium hydroxide required to neutralize all acidic constituents in a 1 g sample, depends upon the molecular weight of polyisobutylcarboxylic acid. Thus, when the molecular weight of the polyisobutyl group is 300, the acid number will be about 149 to 186, and when the molecular weight is 3000 the acid number will be about 15 to 18. The acid number is conveniently determined by a conventional direct titration method including the potentiometric method of ASTM D 664. Starting with a polyisobutylene of a given molecular weight, the observation that the acid number is very close to the theoretical acid number, coupled with the retention of the molecular weight in the polyisobutylcarboxylic acid indicate that the predominant proportion of the carboxylic acid composition is a polyisobutylcarboxylic acid.

There is present less than about 20%, by weight, of neutral polyisobutyl component. The neutral (non-acidic) component is predominantly polyisobutyl ketone as indicated by infrared spectroscopy and nuclear magnetic resonance spectroscopy. There may also be present a small amount of unreacted polyisobutylene as well as any saturated polymer that was present in the original polyisobutylene.

That the carboxylic acid compositions contain only a minor proportion of a neutral polyisobutyl component is important because the polymeric nature of the products makes the separation of the polyisobutylcarboxylic acid component from the rest of the reaction mixture difficult and costly.

In acid compositions obtained from polyisobutylene of 750 molecular weight, usually less than about 20% of the acid is extractable whereas in acid compositions prepared from polyisobutylene of 300 molecular weight somewhat more will be extractable. In acid compositions prepared from polyisobutylene of 3000, usually less than about 5% of the acid is extractable.

Extractability is determined by dissolving a given weight of the carboxylic acid composition in diethylether and extracting with aqueous 10% sodium carbonate solution (one half volume) followed by extraction with water (one half volume). The aqueous layers are combined, acidified with excess hydrochloric acid and extracted with diethyl ether. The ether layer is separated and dried and the ether is removed by evaporation to yield the extractable acid.

Additional details concerning the carboxylic acid compositions can be found in my coassigned patent application, entitled "Polyisobutylcarboxylic Acid Composition", filed concurrently herewith and bearing Attorney's Docket No. OR-5823.

The Polyisobutylene Starting Reactant

Polyisobutylenes are normally prepared by cationic polymerization of isobutylene. Polyisobutylenes consist predominantly of 1,2-isobutylene units. Polymer unsaturation is predominantly at the alpha or the beta position represented by, $RCH_2—C(CH_3)=CH_2$, and, $RCH=C(CH_3)_2$, where R represents a polyisobutyl group. In commercial polyisobutylenes about 80% of the unsaturation is believed to be at the beta position and about 20% at the alpha position.

In the context of the present invention, the term "polyisobutylene" means a hydrocarbon polymer containing 1,2-isobutylene units derived from isobutylene; there being present a total of up to 10% of units derived from low molecular weight monoolefins such as 1-butene and 2-butene, and from cleaved, isomerized or oligomerized isobutylene, said polymer containing an olefin linkage at or near the terminal carbon atom of the polymer chain. The term "polyisobutyl" refers to the saturated hydrocarbon radical derived from such polyisobutylene.

Not included within the above-mentioned scope of polyisobutylenes are copolymers of isobutylene and conjugated dienes. Such polymers, characterized by the presence of several olefinic linkages distributed in the polymer chain for crosslinking purpose, suffer extensive cleavage of the polymer chain with attendant loss in molecular weight when functionalized by the oxidation of the olefinic linkages.

For reasons of availability and economy it is preferred to employ commerical polyisobutylenes in the practice of this invention. Commercial polyisobutylenes of different molecular weights are available from a number of sources. For example, each of the polyisobutylenes of the following designated grades (average molecular weight as given by the manufacturer (Chevron) is in parenthesis) is suitable for the practice of the present invention: Polybutenes 6 (300); 8 (440); 12 (530); 16 (640); 18 (730); 20 (800); 24 (950); 32X (1260); 32 (1400); 122 (2500); and 128 (2700). Preferred polyisobutylene molecular weights are about 1200 to 2000.

Utility of the Acid Products

The polyisobutylcarboxylic acids described herein are useful in gasoline and in lubricating oils as corrosion inhibitors, lubricity agents, detergents, thickening agents and the like. Also useful in gasolines as carburetor detergents and in lubricating oils as detergent-dispersants are various polyisobutylcarboxylic acid derivatives such as carboxamides comprising N-substituted amides of polyisobutylcarboxylic acids, the polyisobutylcarboxylic acid component of the carboxamide being derived from polyisobutylcarboxylic acid compositions consisting essentially of at least about 80% by weight of polyisobutylcarboxylic acid, the balance being neutral polyisobutyl components, said composition characterized in that: (1) substantially all carboxyl groups of said polyisobutylcarboxylic acid are attached to tertiary carbon atoms of said polyisobutyl groups; (2) the polyisobutyl groups have an average molecular weight of about 300 to 3000, and an acid number of about 15 to 186; and (3) the N-substituted component of the carboxamide has the formula, —N(R)Z, where R is hydrogen or lower alkyl, and Z is

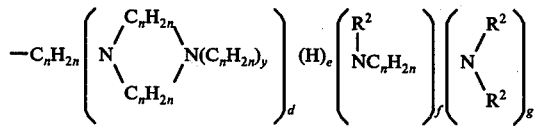

where $n$ is 2 or 3, $R^2$ is independently hydrogen or lower alkyl, $d$, $e$, $g$ and $y$ are 0 or 1, and $f$ is to 0 to 5, with the provisos that:
a. when $d = 0$, then $e = 0$, $f = 1$ to 5 and $g = 1$,
b. when $d = 1$ and $y = 0$, then $e = 1$ and $f$ and $g$ are 0, and
c. when $d = 1$ and $y$ 32 1, then $e = 0$, $f = 1$ to 5 and $g = 1$.

Additional details concerning said carboxamides can be found in my coassigned patent application, entitled "Polyisobutylcarboxylic Acid Amides", filed concurrently herewith and bearing Attorney's Docket No. OR-5824.

The following Examples illustrate the process of this invention.

EXAMPLE 1

Reaction with Ozone

Commercial polyisobutylene of about 1500 molecular weight, 80 g, was dissolved in 400 ml of carbon tetrachloride in a reaction flask equipped with a gas inlet tube, a mechanical stirrer and a reflux condenser. The reaction mixture was maintained at 25° C by means of an external bath. Ozone-oxygen was passed into the polyisobutylene solution for 2 hours at the rate of 23.6 ml/min. (66 mg ozone per minute). Carbon tetrachloride was removed under reduced pressure. The reaction product was characterized as predominantly polyisobutyl ketone by means of infrared spectroscopy and nuclear magnetic resonance spectroscopy.

Oxidation with Nitric Acid

Ozonized polyisobutylene prepared as above, 300 g, was dissolved in 250 ml of carbon tetrachloride in a reaction flask equipped with an agitator, a condenser, a thermometer and an addition funnel, and 100 g concentrated (70%) nitric acid was added. The reaction mixture was kept at 20° to 30° C by means of an external bath and over a period of 2 hours 50 g of concentrated sulfuric acid was added. The reaction mixture was then heated to reflux at 65° to 70° C and kept at reflux for 16 hours. About 300 ml of n-hexane was added to the reaction mixture and the solution was washed with a 1:1 by volume mixture is isopropanol-water until free of mineral acid. The solution was dried over anhydrous sodium sulfate, filtered and the solvent removed under reduced pressure leaving a liquid product. The acid number was 33 as determined electrometrically according to ASTM D664 Method. Based on the theoretical acid number of 37.3 for a polyisobutylcarboxylic acid of 1500 molecular weight, the yield of polyisobutylcarboxylic acid was 88.5%.

In the same manner, polyisobutylcarboxylic acids can be made from commercial polyisobutylenes having molecular weights of about 300 to 3000.

EXAMPLE 2

Reaction with Ozone

Commercial polyisobutylene of about 1500 molecular weight, 80 g, was dissolved in 400 ml of carbon tetrachloride in a reaction flask equipped with a gas inlet tube, a mechanical stirrer and a reflux condenser. The reaction mixture was maintained at 25° C by means of an external bath. Ozone-oxygen was passed into the polyisobutylene solution for 2 hours at the rate of 23.6 ml/min. (66 mg ozone per minute). Carbon tetrachloride was removed under reduced pressure. The reaction product was characterized as predominantly polyisobutyl ketone by means of infrared spectroscopy and nuclear magnetic resonance spectroscopy.

Oxidation with Nitric Acid

Ozonized polyisobutylene prepared as above, 150 g, was dissolved in 400 ml of carbon tetrachloride in a reaction flask equipped with an agitator, a condenser, a thermometer and an addition funnel. Vanadium pentoxide, 6 g, and Aliquot 336 (a surfactant), 15 g, were added to the solution. To the mixture was added 75 g of 70% nitric acid over a period of 1 hour. The mixture was then heated to reflux, 65° to 70° C, and kept at reflux for 9 hours. The reaction mixture was then allowed to cool to room temperature and 45 ml of concentrated sulfuric acid was added over a 1 hour period. The mixture was again heated to reflux and kept at reflux for three hours during which period an additional 45 ml of sulfuric acid was added over a period of about 1 hour. Refluxing was continued for 5 hours after the completion of sulfuric acid addition.

The reaction mixture was cooled and poured into water and washed with water three times. The mixture was then dried over sodium sulfate, filtered and the solvent was removed under reduced pressure. The acid number was 36.7 which indicated a conversion of polyisobutylene to polyisobutylcarboxylic acid of 98%.

In the same manner, polyisobutylcarboxylic acids can be made from commercial polyisobutylenes of about 300 to 3000 molecular weight.

The embodiments of the invention in which an exclusive property or privilege is claimed are defined as follows:

1. A process for oxidizing polyisobutylene having an average molecular weight of about 300 to 3000 to form a polyisobutylcarboxylic acid composition characterized by at least about 80% by weight of said composition being polyisobutylcarboxylic acid wherein substantially all carboxyl groups are attached to tertiary carbon atoms, the acid composition having no more than about 20% by weight of a nonacidic polyisobutyl component, said process comprising:
   i. contacting the polyisobutylene in a liquid phase at a temperature of about $-80°$ C to 60° C with 1 to 10% by weight of ozone in a carrier gas for a time sufficient to convert substantially all of the polyisobutylene to ozonized polyisobutylene, and
   ii. contacting the ozonized polyisobutylene with aqueous nitric acid of specific gravity of about 1.18 to 1.48 at a temperature of about 20° C to 110° C for a time sufficient to convert substantially all of said ozonized polyisobutylene to said polyisobutylcarboxylic acid composition.

2. A process according to claim 1 comprising, in step (i), dissolving the polyisobutylene in an ozone-inert solvent therefor, and in step (ii), dissolving the ozonized polyisobutylene in a nitric acid-inert solvent therefor.

* * * * *